United States Patent [19]
Recker

[11] 3,849,007
[45] Nov. 19, 1974

[54] DIRECTION INDICATOR FOR COUPLING
[76] Inventor: Florian B. Recker, Hopkinton, Iowa 52237
[22] Filed: Nov. 3, 1972
[21] Appl. No.: 303,337

[52] U.S. Cl. .................................. 403/27, 403/350
[51] Int. Cl. ............................................. F16l 55/00
[58] Field of Search .................. 285/93; 287/DIG. 8; 138/104; 279/19, 19.1, 19.2, 19.3, 19.4, 19.5, 19.6, 19.7; 403/27

[56] References Cited
UNITED STATES PATENTS

| | | | |
|---|---|---|---|
| 1,159,845 | 11/1915 | Kidd | 285/93 |
| 2,256,248 | 9/1941 | Hansen | 287/DIG. 8 |
| 2,776,841 | 1/1957 | Prochazka | 279/19.4 |
| 3,179,450 | 4/1965 | Recker | 279/35 |

FOREIGN PATENTS OR APPLICATIONS 70,949  7/1915  Switzerland.......................... 285/93

Primary Examiner—James R. Boler
Assistant Examiner—Conrad L. Berman
Attorney, Agent, or Firm—Henderson & Strom

[57] ABSTRACT

An improvement for locking collars of the type adapted to lock a rotatable shaft to a second rotatable member such as a bearing or a drive shaft. The improvement comprises a direction indicium on the periphery of the locking collar to indicate the direction of rotation for releasing the locking collar. A shoulder adapted to be struck by an impact tool is included as a part of the direction indicium.

3 Claims, 2 Drawing Figures

PATENTED NOV 19 1974 3,849,007

DIRECTION INDICATOR FOR COUPLING

BACKGROUND OF THE INVENTION

Locking collars of many types are used to connect a rotatable shaft to a bearing, drive shaft, or the like. Examples of different types of locking collars include spring-loaded "quick-release" couplings, eccentrically bored collars for locking a shaft to a bearing, as well as conventional set screw or slot-and-key couplings.

Locking collars are used in a wide variety of applications, and in some of these, most notably in outdoor or corrosive environments, it is not unusual for a particular coupled unit to be unused and unattended for substantial periods of time. In particular, couplings used seasonally, such as with agricultural equipment, often are allowed to rust or otherwise seize, and then the question arises as to which direction the collar must be turned, relative to a shaft, to remove the collar. Whether the collar must be turned to the right or the left depends upon the particular design and use thereof, and it is generally not possible to tell from external appearances which direction is correct.

One example where this invention is applicable is with a spring-loaded automatic return coupling as described in my U.S. Pat. No. 3,179,450, which describes in detail one embodiment of an automatic-return coupling, and which disclosure is incorporated herein by reference.

Another example where this invention is applicable is with the conventional eccentrically bored locking collar used to connect a rotating shaft to a bearing. Such bearing and collar combinations are available from a number of industrial suppliers, and in some cases an opening for insertion of a special wrench is drilled or otherwise formed in the collar portion of the unit to facilitate removal thereof. However, such openings, on presently available units, have no means for indicating the proper direction of rotation for removal thereof. Accordingly, when the operator desires to remove a rusted or frozen collar from a shaft, he has no satisfactory way of knowing which direction to rotate the collar.

Accordingly, there has long been a need for a direction indicium on collars and couplings to indicate the proper direction of rotation for removal of same. There has also been a need for a shoulder or the like on a collar adapted to be struck by an impact tool.

SUMMARY OF THE INVENTION

According to this invention, a direction indicium is provided on the periphery of a locking collar to indicate the proper direction of rotation for removing the collar from a shaft or the like. The direction indicium may be formed in any suitable manner, but generally is formed by an appropriate machining step in the case of hard metal collars.

According to another aspect of this invention, the direction indicium is formed to provide a shoulder for striking with an impact tool, the shoulder being formed so as to be operable only in one preselected direction.

DESCRIPTION OF THE PREFERRED EMBODIMENTS

The preferred embodiments of the invention will now be described by reference to the drawings. It should be understood that the following descriptions are exemplary, and that numerous modifications and variations could be utilized without departing from the invention.

Figure 1:
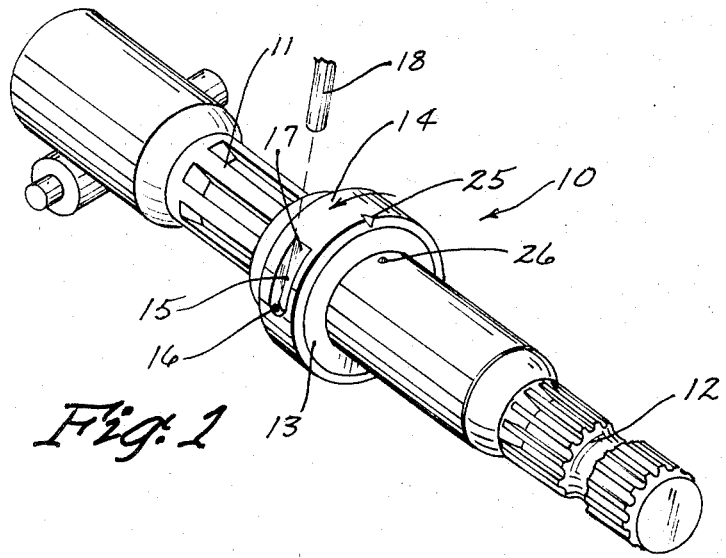
FIG. 1 is a perspective view of a splined connection joined by a locking collar utilizing the improvements of this invention.

In FIG. 1, an adapter shown generally at 10 includes a six spline shaft 11 coupled to a twenty one spline shaft 12 by a spring-loaded coupler 13. The coupler 13 may be, for example, of the type described in my U.S. Pat. No. 3,179,450 or an adaptation thereof. In the coupling illustrated in FIG. 1, a ring or sleeve 14 forms the periphery, and is rotatable relative to the shaft 12 to effect attachment to and release from the shaft 11 in a known manner.

The sleeve 14 includes a machined groove 15 having a shoulder 16 and a tailing portion 17 constituting a direction indicium indicating the proper direction of rotation for unlocking of the coupler 13 from the shaft 11.

In operation, when it is desired to disconnect the shafts 11 and 12 from one another, the sleeve 14 is rotated to the left and the adaptor 10 is pulled away from the shaft 11. In the event that the coupling is rusted or corroded, and not susceptibel to hand-turning, an impact tool such as a punch 18 is placed against the shoulder 16 and struck with a hammer.

It should be noted that the groove 15 has a shoulder at one end only, so that the operator will easily know which direction to turn the ring 14 in order to remove the coupler 13.

The sleeve 14 also includes a filed notch 25, and shaft 12 has a raised spot 26 thereon which is in alignment with the notch 25 when the adaptor 10 is properly seated. The notch 25 and raised spot 26 enables an operator to tell by sight or touch when the adaptor 10 is properly seated. The raised spot 26 could alternatively be a drilled or punched indentation, but this is not preferred as indentations tend to be filled with dirt, paint and the like, making them difficult to use effectively.

Figure 2:
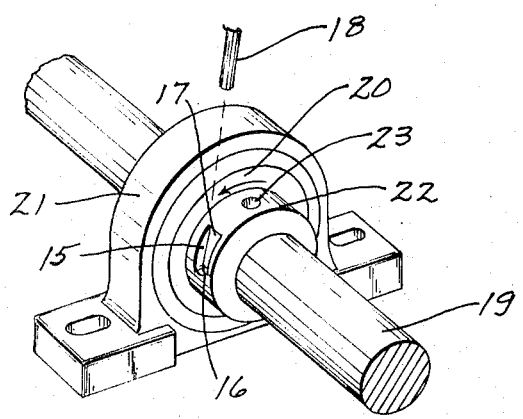
FIG. 2 is a perspective view of a shaft coupled to a bearing by an eccentrically-bored collar, the collar utilizing the improvements of this invention.

A similar embodiment of the invention is illustrated in FIG. 2 wherein a shaft 19 extends through a bearing 20 mounted in a bearing block 21. The shaft 19 is secured to the bearing 20 for rotation therewith by a locking collar 22. The shaft 19 extends through a central opening in collar 22, which includes an internal eccentrically bored opening (not shown) adapted to receive a mating eccentrically formed extension (not shown) from bearing 20 for locking the shaft 19 to the bearing 20. As mentioned above, eccentrically-bored locking collars of this type have been known and used for many years. The locking collar 22 has a machined groove 15 having a shoulder 16 and a tailing portion 17 substantially as described in connection with the FIG. 1 adaptor. A bore 23 is formed in collar 22 for use with a conventional hooked locking tool (not shown). In the embodiment illustrated in FIG. 2, a hooked locking tool would be inserted in bore 23 and turned to the right to initially tighten the collar 22 about the shaft 19.

The operation of the FIG. 2 embodiment is as follows: the shaft 19 is inserted in bearing 20, collar 22 is then placed up against bearing 20 and receives an eccentric extension from bearing 20 within an eccentric bore. Slight turning of the collar 22 to the right, such as by turning a hooked locking tool which is inserted in bore 23, locks the shaft to the bearing so that the shaft turns with and is supported by the bearing. A set screw (not shown) may be used to help hold the collar in place. When the bearing is not to be replaced or the shaft removed therefrom, the shoulder 16 of collar 22 is struck by punch 18 as described in the FIG. 1 embodiment.

The above detailed descriptions of the preferred embodiments of the invention are for purposes of illustration of the invention, and are not to be considered as limiting the same.

I claim:

1. In a locking collar of the type used to connect a first rotatable shaft to a second rotatable means, the locking collar being releasable upon rotation in one direction only relative to said first rotatable shaft, the improvement comprising a groove disposed in the outer periphery of the locking collar with the bottom thereof tapering on one end thereof from a point on the periphery of the collar to a point radially inwardly from the outer periphery at the other end of the groove, said other end of the groove having an end wall which extends substantially radially outwardly from a point near the bottom of the groove to the outer periphery of the locking collar; and means for guiding a punch against said end wall in one direction comprising two sidewalls on said groove extending from the periphery of the locking collar to a distance generally inwardly from the periphery of the locking collar for guiding a punch squarely against said end wall.

2. The locking collar of claim 1 wherein the locking collar is an eccentric type.

3. The locking collar of claim 1 wherein the locking collar is a spring-loaded automatic return type.

* * * * *